United States Patent [19]

Mollman

[11] Patent Number: 4,506,118

[45] Date of Patent: Mar. 19, 1985

[54] MULTIPLE POSITION ELECTRICAL SWITCH

[75] Inventor: Walter G. Mollman, Cedar Rapids, Iowa

[73] Assignee: Rockwell International Corporation, El Segundo, Calif.

[21] Appl. No.: 485,562

[22] Filed: Apr. 15, 1983

[51] Int. Cl.[3] ........................ H01H 9/00; H01H 15/00; H04M 1/30

[52] U.S. Cl. .................................. 200/1 R; 179/90 K; 200/5 R; 200/16 R; 200/153 K

[58] Field of Search .......... 200/5 R, 6 R, 6 A, 153 K, 200/1 R; 179/85, 90 R, 90 B, 90 K

[56] References Cited

U.S. PATENT DOCUMENTS

| | | | |
|---|---|---|---|
| 2,507,016 | 5/1950 | Hesh | 200/6 A |
| 3,005,055 | 10/1961 | Mattke | 179/90 K |
| 3,731,013 | 5/1973 | Nightengale | 200/6 A X |
| 4,107,499 | 8/1978 | Weidler | 200/16 R X |
| 4,115,670 | 9/1978 | Chandler | 200/153 K X |
| 4,171,470 | 10/1979 | Gettig | 200/6 A |
| 4,348,556 | 9/1982 | Gettig et al. | 200/6 A X |

FOREIGN PATENT DOCUMENTS

| | | | |
|---|---|---|---|
| 569965 | 6/1945 | United Kingdom . | |
| 627545 | 8/1949 | United Kingdom . | |
| 2064221A | 6/1981 | United Kingdom | 200/6 A |

*Primary Examiner*—J. R. Scott
*Attorney, Agent, or Firm*—Carmen B. Patti; V. Lawrence Sewell; H. Fredrick Hamann

[57] ABSTRACT

A multiple position switch includes a housing containing a plurality of membrane switches located in a predetermined pattern. A spring-based, normally centered actuator is mounted in the housing for selective movement to actuate one of the switches. A finder plate is attached to the housing and has a notched circular opening in alignment with the plurality of switches. The actuator is guided to a selective switch location by its engagement with one of the finder plate notches when the actuator is moved in close proximity to a selective switch location.

2 Claims, 3 Drawing Figures

MULTIPLE POSITION ELECTRICAL SWITCH

BACKGROUND OF THE INVENTION

The present invention relates in general to multiple position electrical switches, and in particular, to momentary contacts which is of the type which is used in telephone equipment. Telephone dialing mechanisms are well known in the prior art and generally are either of the rotating dial type or push button type. The dial type uses a predetermined rotation to identify which one of ten or more positions has been selected. Each position has a number or symbol associated with it, and/or a group of three alphabetic notations. More recently, pushbutton telephones have been utilized which typically have a three-by-four matrix of momentary contact switches.

The switching mechanisms used in the prior art telephones have a number of disadvantages. The dial type has a large number of mechanical parts, and is expensive to manufacture and maintain. The pushbutton telephone is difficult to use in the dark if it does not have lighted pushbuttons and, of course, would have to be operated carefully by a person who is blind. Since each button is operated independently, the operator must remove his finger from one button and find the next button to push when dialing a telephone number. Although the pushbutton telephone is more economical to manufacture than the dial-type telephone it still consists of a significant number of individual parts.

The present invention overcomes these drawbacks in the prior art.

SUMMARY OF THE INVENTION

The present invention involves a multiple position switch mechanism comprising means for providing a housing, means for switching supported by the means for providing a housing, and having a predetermined pattern of switching locations, and movable means for activating the means for switching contained at least partially within the means for providing the housing and having an initial rest position different from the switching locations. The means for switching is activated by moving the means for activating to the switching location.

OBJECTS OF THE INVENTION

It is a primary object of the present invention to provide an improved multiple position switching mechanism for use with the telephone.

It is another object of the present invention to provide a multiple switching mechanism which has only one button.

It is a further object to provide a switching mechanism which has a minimum of parts and is compact.

It is yet another object to provide a switching mechanism which is reliable in operation and economical to manufacture.

BRIEF DESCRIPTION OF THE DRAWINGS

The features of the present invention which are believed to be novel are set forth with particularity in the appended claims. The invention, together with further objects and advantages, may be best understood by reference to the following description taken in conjunction with the accompanying drawings in the several figures of which like reference numerals identify like elements, and in which:

DESCRIPTION OF THE PREFERRED EMBODIMENT

Figure 1:
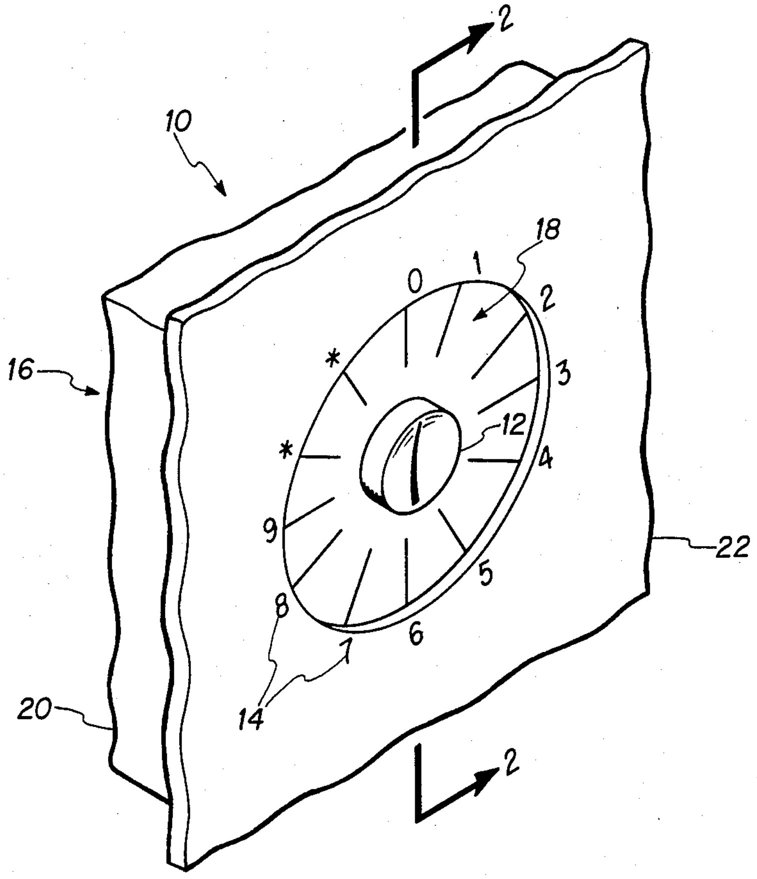
FIG. 1 is a perspective view of the novel multiple position switch mechanism.

The present invention has general applicability, but is most advantageously used for the dialing mechanism of a telephone. In the embodiment shown in FIG. 1, the novel multiple position switch mechanism 10 has one center button 12 located in the center of a substantially circular pattern of positions 14. The preferred embodiment has 12 such positions 14 designated with the digits zero to nine and the asterisk and pound symbols. For ease of operation, the digits one to nine are placed in the same position around the center as the digits on a clock.

To operate the switch 10, a person places one finger on the button 12 and moves it toward a selected digit or symbol. To dial a telephone number, a person can move the center button 12 to the digits in the proper sequence without moving his finger from the button. It is also possible to provide a lighted button or other lighting capability. For example, the digits and symbols could be etched in a clear plastic escutcheon, and all of them lighted by one or two light sources at the ends of the escutcheon.

Figure 2:
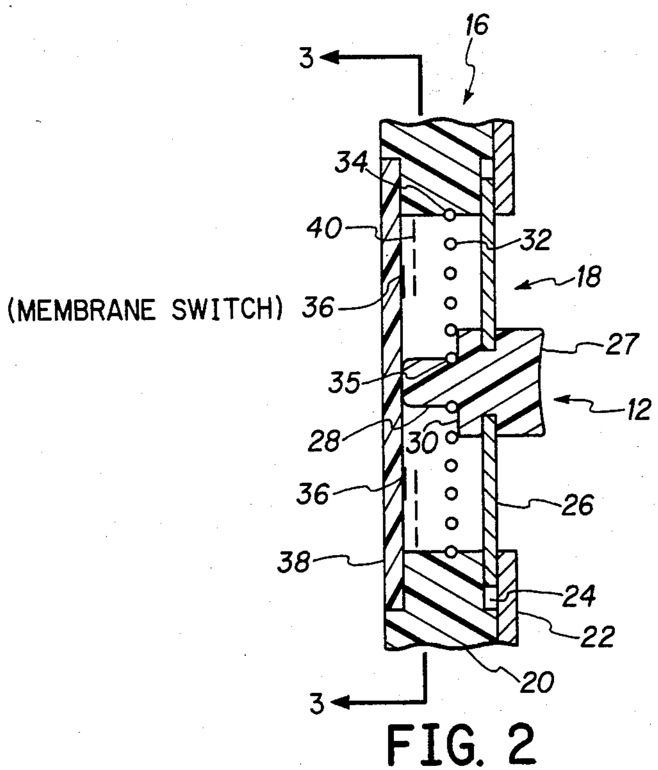
FIG. 2 is a cross-sectional view of the FIG. 1 switch.

FIG. 2 shows a cross-sectional side view of the preferred embodiment. A housing 16 is provided and has a circular opening 18. As shown in FIG. 2, the housing 16 has a body 20 to which is attached an escutcheon 22. When assembled, a circular groove 24 is formed around the circular opening 18. A front shield 26 is attached to the button 12 and rides in the groove 24, such that the button 12 may be displaced outward from the center of the circular opening 18. The button 12 and front shield 26 could be a one-piece molding. The button 12 has any suitable configuration for gripping the button on a first section 27, and a protrusion 28 in a second section or rear side 30.

A biasing spring 32 is provided and held in place by a notch 34 in the body 20 of the housing 16, and by notch 35 in the button 12. The biasing spring 32 provides a means for automatically returning the button 12 to an initial rest position at the center of the circular opening 18.

Figure 3:
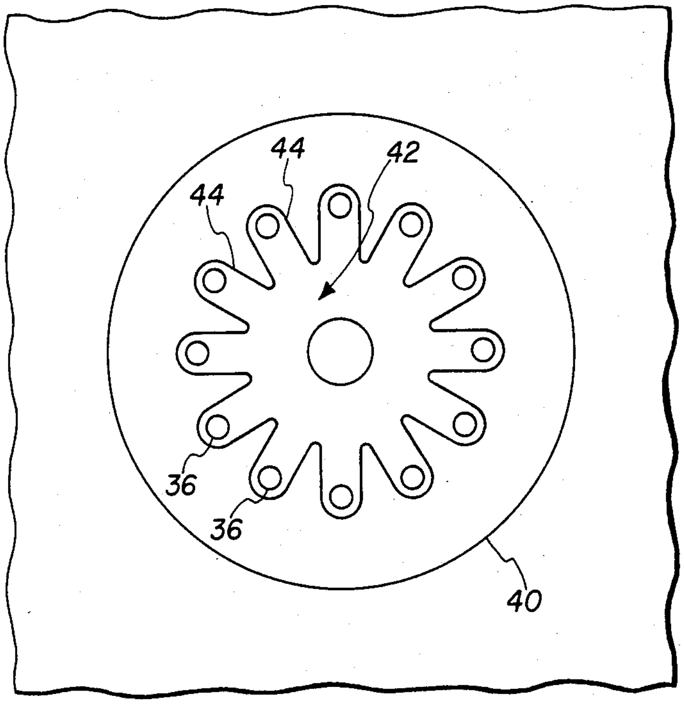
FIG. 3 is a front view of some of the internal parts of the FIG. 1 switch.

A plurality of electrical switches 36 are located in predetermined locations (see FIG. 3) behind the button 12 and front shield 26. In the preferred embodiment, 12 membrane electrical switches 36 are mounted on substrate 38 which is attached to the body 20 of the housing 16 as is shown in FIG. 2. When the button 12, is moved to a position directly over a selected switch 36 protrusion 28 engages a switch 36 and causes it to make electrical connection. It is to be understood that any one of a number of different types of switches could be used, such as photo sensitive devices responsive to a lighted button or an interrupt arrangement using magnetic or light sources and receivers. The novel switches could also be adapted to fluidics technology.

A finger plate 40 is attached to the body 20 of the housing 16 adjacent to the substrate 38, and guides the protrusion 28 when the button 12 nears the selected switch 36. Although the finder plate 40 could be omitted, it provides ease of operation. Thus, the one button 12 is a means for activating any one of the switches 36. In the preferred embodiment, the finder plate 40 is a substantially flat plate having a circular opening 42 with a plurality of notches 44 spaced around the perimeter. The notches 44 are in alignment with the switching locations of the switches 36. The notches 44 engage the protrusion 28 on the button 12 at least when the button 12 is moved into close proximity to the switching locations. The invention is not limited to the particular details of the apparatus depicted, and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A multiple position switch mechanism comprising:

means for providing a housing;

means for switching supported by said means for providing a housing and having a predetermined pattern of switching locations located in a first flat plane;

a movable means for activating said means for switching contained at least partially within said means for providing a housing and having an initial rest position different from said switching locations wherein said means for switching is activated by moving in a second flat plane parallel to said first flat plane said means for activating to said switching locations;

means for biasing attached to said means for activating and to said means for providing a housing such that said means for activating returns to said initial rest position after being moved to said switching location; and means for guiding said means for activating to said switching location, said means for guiding being attached to said means for providing a housing and in contact with said means for activating at least when said means for activating is moved into close proximity to said switching location.

2. A multiple position switch mechanism comprising:

a housing having an opening;

a plurality of electrical switches contained within said housing each having a predetermined switching location and located in a first flat plane;

movable means for activating said switches and contained at least partially within said housing and within said opening in said housing, said means for activating having an initial rest position different from said switching locations and being movable in a second flat plane parallel to said first flat plane;

a biasing spring attached to said housing and to said means for activating such that said means for activating returns to said initial rest position after being moved to said switching location; and a finder plate having a substantially circular opening with a plurality of notches spaced around the perimeter of said circular opening and attached to said housing, said notches being in alignment with said switching locations which are arranged in a substantially circular pattern wherein said means for activating engages said notches at least when said means for activating is moved into close proximity to said switching location, wherein said switches are activated by moving in a second flat plane parallel to said first flat plane said means for activating to one of said switching locations where said means for activating engages one of said switches.

* * * * *